United States Patent [19]
DuBois et al.

[11] Patent Number: 6,090,745
[45] Date of Patent: Jul. 18, 2000

[54] PROCESS FOR PREPARING WATER-TREATMENT CATALYSTS

[75] Inventors: Jean-Luc DuBois, Vernaison; Edmond Payen, Jenlain; Michel Fournier, Marcq En Varoeul; Pascal Blanchard, Lens; Anne Griboval, Lewarde, all of France

[73] Assignee: Elf Antar France, Courbevoie, France

[21] Appl. No.: 09/202,171

[22] PCT Filed: Jun. 10, 1997

[86] PCT No.: PCT/FR97/01029

§ 371 Date: Mar. 22, 1999

§ 102(e) Date: Mar. 22, 1999

[87] PCT Pub. No.: WO97/47385

PCT Pub. Date: Dec. 18, 1997

[30] Foreign Application Priority Data

Jun. 13, 1996 [FR] France .................................. 96/07330

[51] Int. Cl.$^7$ ............................. B01J 23/00; B01J 27/19; B01J 21/08; B01J 21/02; B01J 27/185
[52] U.S. Cl. .......................... 502/313; 502/210; 502/211; 502/213; 502/214; 502/204; 502/206; 502/207; 502/255; 502/259; 502/260; 502/321; 502/315; 502/316; 502/337
[58] Field of Search ..................................... 502/208, 210, 502/211, 213, 214, 202, 204, 206, 207, 232, 255, 259, 260, 305, 313, 315, 316, 321, 337

[56] References Cited

U.S. PATENT DOCUMENTS

| | | | |
|---|---|---|---|
| 5,164,354 | 11/1992 | Aldridge et al. | 502/220 |
| 5,330,955 | 7/1994 | Wegman | 502/210 |
| 5,332,709 | 7/1994 | Nappier et al. | 502/211 |
| 5,336,654 | 8/1994 | Aldridge et al. | 502/170 |
| 5,338,717 | 8/1994 | Aldridge et al. | 502/211 |

*Primary Examiner*—Mark L. Bell
*Assistant Examiner*—Patricia L. Hailey
*Attorney, Agent, or Firm*—Burgess, Ryan & Wayne

[57] ABSTRACT

The invention provides a method for preparing catalysts, containing metals of groups VI and VIII on a carrier. The metals of groups VI and VIII metals are introduced in the form of a compound of formula $M_x A B_{12} O_{40}$ in which M is cobalt and/or nickel, A is phosphorus, silicon and/or boron, B is molybdenum and/or tungsten and x is 2 or more, 2.5 or more, or 3 or more depending on whether A is respectively phosphorus, silicon or boron. The catalysts thus obtained are useful for hydro-treating hydrocarbon feedstocks.

13 Claims, No Drawings

PROCESS FOR PREPARING WATER-TREATMENT CATALYSTS

BACKGROUND OF THE INVENTION

1) Field of the Invention

The present invention relates to a process for preparing catalysts comprising metals from groups VI and VIII on a support, as well as to the use of the said catalysts for the water-treatment of hydrocarbon charges.

2) Background Art

A standard process for manufacturing water-treatment catalysts containing metals from groups VI and VIII consists in impregnating, for example by immersion, spraying or mixing, a porous inorganic support with a common solution or individual solutions of soluble compounds of metals from groups VI and VIII, working in one or more steps. After impregnation, the support thus treated is dried and can undergo various treatments, for example heating in an oxidative, neutral or reductive atmosphere, sulphurization with hydrogen sulphide or with other sulphur compounds, in particular organosulphur compounds, or a combination of these treatments.

It has been proposed to introduce into the support compounds containing, in the same molecule, both at least one metal from group VI and at least one metal from group VIII. Heteropolyacid salts of metals from group VIII, for example the cobalt and/or nickel salts of phosphomolybdic, phosphotungstic, silicomolybdic and silicotungstic acid, have been used in particular for this purpose. This proposal is described, for example, in documents U.S. Pat. Nos. 2,547,380 and 2,608,534.

The use of reductive compounds to prepare catalysts has already been proposed.

Thus, U.S. Pat. No. 5,332,709 proposes to stabilize aqueous solutions of compounds of the elements from groups VI B and VIII by the simultaneous use of an inorganic phosphorus acid, such as phosphoric acid, and a reductive compound. The solutions contain a high proportion of phosphoric compound, generally from 5 to 15 or 20% by weight of the phosphorus acid.

Similarly, U.S. Pat. No. 5,338,717 proposes to reduce a compound of a metal from group VI, such as phosphomolybdic acid, by using a reducing agent after the compound of the metal from group VI has been deposited on a support and the impregnated support has been dried. The catalyst obtained, which also contains a compound from group VIII, is indicated as being useful as a water-treatment catalyst.

Phosphoric acid is also used in EP-A-0,300,629, EP-A-0,357,295 and EP-A-0,496,592 with compounds of metals from groups VI and VIII and with a sulphur compound capable of sulphurizing the catalyst. In this case also, the phosphoric acid is present in large amount.

Whatever the merit of the catalysts obtained by these methods, studies should be carried out in order to obtain more active catalysts and/or catalysts with longer lifetimes, in order to meet the increasingly stringent environmental legislation requirements.

SUMMARY OF THE INVENTION

The process of the invention is based on a novel concept, i.e. of creating a molecule which contains both at least one compound of a metal from group VI and at least one compound of a metal from group VIII in combined form and in relative proportions which make it possible to obtain increased activity for the catalyst obtained by impregnating a support with a solution of the said molecule.

The use, for example, of cobalt and/or nickel phosphomolybdate, phosphotungstate, silicomolybdate or silicotungstate went some way towards addressing this concern, but did not give catalysts with high activity, possibly on account of the unsatisfactory molar ratios between the metal from group VI and the one from group VIII. For example, cobalt or nickel phosphomolybdate has the formula $Me_{1.5}PMo_{12}O_{40}$ where Me is nickel or cobalt. Impregnating a porous inorganic support with an aqueous solution of such a compound gives a catalyst of low activity.

The authors of the present invention have forwarded the hypothesis in which the activity of these catalysts containing a molecule combining both the metal from group VI and the metal from group VIII might be increased if it could be possible to create a molecule combining the two (or more) metals with a relative proportion of the metal from group VIII which is higher than in the abovementioned phosphorus and silicon compounds.

At the conclusion of their studies, the authors of the present invention have managed to obtain compounds, which are soluble in aqueous media, combining metals from groups VI and VIII with an increased content of metal from group VIII. These compounds are able to be isolated and analysed and the use of their aqueous solutions to impregnate inorganic porous supports for catalysts, usually metal oxides alone or as a mixture, or alternatively crystalline compounds including zeolites, leads to hydrotreating catalysts with increased activity.

DESCRIPTION OF THE PREFERRED EMBODIMENTS

The process for preparing an hydrotreating catalyst according to the invention comprises at least a first phase of impregnating a support with an aqueous solution of at least one compound which combines at least one metal from group VI and at least one metal from group VIII in the same molecule, and at least a second phase of drying and activating the impregnated support, and is characterized in that the compound which combines the metals from groups VI and VIII corresponds to the formula:

$$M_xAB_{12}O_{40} \qquad (I)$$

in which M is cobalt and/or nickel, A is chosen from phosphorus, silicon and boron, B is molybdenum and/or tungsten and x takes values of 2 or more, preferably from 2 to 7, if A is phosphorus, values of 2.5 or more, preferably from 2.5 to 8, if A is silicon, and values of 3 or more, preferably from 3 to 8, if A is boron.

The abovementioned compound of formula I should be distinguished from a simple mixture of compounds such as those resulting, for example, from the interaction of $MoO_3$ and $H_3PO_4$, in any proportions, with a cobalt salt and a reducing agent. The reason for this is that this compound can be isolated by evaporation of its solution and it can be characterized by various methods which distinguish it from the abovementioned simple mixture. Among these methods, mention may be made of the following: NMR, polarography and UV and infrared spectroscopies.

It results from the general formula (I) that at least some of the molybdenum or tungsten is in a valency state below its normal value of six as it results from the composition, for example, of the "normal" phosphomolybdic, phosphotungstic, silicomolybdic or silicotungstic acid, or formula (III) indicated later, and the cobalt and nickel salts of formula (I) can be distinguished from the "normal" cobalt and nickel salts of formula (III) indicated later, by various methods, and in particular by NMR, polarography and UV and infrared spectroscopies.

The catalyst can be activated, after drying, in several ways known in the art. It is possible, for example, to carry out heating in an oxidative atmosphere (for example oxygen or air), a neutral atmosphere (for example nitrogen or argon) or a reductive atmosphere (for example hydrogen) at a temperature at least equal, for example, to 80° C. and preferably greater than 250° C. It is also possible to sulphurize the catalyst using inorganic or organic sulphur compounds, for example hydrogen sulphide or an organic mercaptan, sulphide, disulphide or polysulphide. Several of these methods can also be combined and, for example, a calcination in air or in a neutral atmosphere can be carried out, followed by a sulphurization. The sulphurization can be carried out at the site of production of the catalyst or, later, during the implementation of an hydrotreating operation.

In one specific embodiment, the catalyst is heated under a neutral or oxidative atmosphere to a temperature of at least 250° C., for example from 300 to 800° C.

In another embodiment, the catalyst is mixed with a sulphur compound at a temperature of, for example, 20 to 350° C., so as to presulphurize it.

The preparation of the aqueous impregnation solution is an important feature of the present invention.

This can be carried out in several ways. A first embodiment consists in treating an aqueous solution of a "normal" molybdenum or tungsten heteropolyacid with a reducing agent and in adding a cobalt and/or nickel compound, before, during or after the reduction, in an amount which is sufficient to salify the acid functions present, so as to obtain a compound of formula (I).

The term "normal" heteropolyacid is understood here to refer to a compound in which the valency of the molybdenum or the tungsten is equal to six, i.e. a compound of formula:

$$H_y AB_{12} O_{40} \quad (II)$$

in which y is equal to 3 if A is phosphorus, 4 if A is silicon and 5 if A is boron, A and B being defined as in formula (I).

In these compounds, the B/A atomic ratio is equal to 12.

A second procedure consists in treating an aqueous solution with a reducing agent, the solution containing (a) a nickel and/or cobalt salt of a normal heteropolyacid as defined above, the salt corresponding to the formula:

$$M_{y/2} AB_{12} O_{40} \quad (III)$$

in which y is equal to 3 if A is phosphorus, 4 if A is silicon or 5 if A is boron, A, B and M being defined as in formula (I), and (b) a nickel and/or cobalt salt of an acid other than a heteropolyacid, the salt (b) being present in an amount which is sufficient to salify the acid functions formed by reduction on the heteropolyacid salt of formula (III).

Another embodiment consists in first reacting the nickel and/or cobalt salt of normal heteropolyacid (a) with the reducing agent and in introducing the salt
(b) only after this reaction.

The nickel and/or cobalt salt of normal heteropolyacid (a) can itself be prepared, for example, by reaction of a heteropolyacid of formula (II) with a cobalt and/or nickel salt of decomposable acid, for example with cobalt and/or nickel carbonate. The process can also be performed by exchange between, for example, cobalt and/or nickel sulphate and the barium salt of a normal heteropolyacid.

The reduction advantageously takes place in a medium which is more or less neutral or, preferably, acidic, i.e. at a pH advantageously of less than 8 and preferably less than 6. It is practical to work in the presence of a carboxylic acid such as, for example, citric acid, tartaric acid, acetoacetic acid, dimethylmaleic acid, dimethylmalonic acid, fumaric acid, furancarboxylic acid, hydroxybenzoic acid, lactic acid or malonic acid, used as buffer.

The reducing agent may be any agent provided that it does not decompose the desired compound of formula I and provided that it is stable and active in neutral or acid medium as defined above. A preferred reducing agent, used in metallic form, is the metal from group VIII which it is desired to introduce into the compound of formula (I), for example cobalt.

The reducing agent can also be a non-metallic compound known for its reductive properties in acid medium, belonging to inorganic or organic chemistry, for example hydrazine, thioglycolic acid, hydroxylamine, thiourea, aluminium hydride, borohydride, hydroquinone or triphenylphosphine.

The amount of reducing agent should be sufficient to at least partially reduce the valency state of the molybdenum or tungsten in the starting "normal" heteromolybdic or heterotungstic compound or the cobalt and/or nickel salt thereof. However, it should not be excessive, so as to avoid undesirable precipitation of the molybdenum and tungsten compounds from their solution.

The cobalt and/or nickel compound added to salify the heteroanionic acid during its reduction or thereafter is advantageously an oxide, hydroxide or salt, preference being given to a salt whose anion can be removed easily in acid medium, which is the case, for example, for cobalt carbonate or nickel carbonate. However, other cobalt and/or nickel salts can be used, such as, for example, an acetate, a formate or a citrate.

More cobalt and/or nickel salt than required by the stoichiometry of the compound of formula (I) can also be used. In this case, the excess cobalt and/or nickel salt is introduced from the start into the impregnation solution, or alternatively it gives rise to an impregnation which follows the impregnation with the compound of formula (I) either directly or after drying the impregnated support, or, lastly, after activation of the impregnated support.

The following examples, given without any limitation being implied, illustrate the invention. The percentages are given by weight except where otherwise mentioned.

In these examples, catalysts were prepared and were then evaluated in a test of desulphurization of thiophene by comparison with standard desulphurization catalysts such as cobalt-molybdenum on alumina. This test is carried out at atmospheric pressure on 200 mg of catalyst (oxide form) which is sulphurized at 40° C. with an $H_2/H_2S$ mixture (90/10%). The desulphurization test is carried out on pure thiophene at 300° C. and the degree of conversion obtained (% of HDS) is measured.

Four reference catalysts A to D were first prepared according to conventional procedures.

COMPARATIVE EXAMPLE A (with phosphorus)

An impregnation solution is prepared by dissolving, in a sufficient volume of water to obtain 68 ml of solution, 17 g of ammonium heptamolybdate hexahydrate, 3.22 g of 85% $H_3PO_4$ and 11.6 g of $Co(NO_3)_2$ added slowly, in the order indicated.

68 ml of this solution is dry-impregnated onto 85 g of Norton® 6176 alumina, with a specific surface equal to 253 m²/g, a pore volume ($H_2O$) equal to 0.94 ml/g and an average pore diameter equal to 9.8 nm.

The impregnated support is left to stand for 2 h and then dried under air at 110° C. for 12 h. It is then calcined at 500° C. under dry air for 4 h with a temperature increase of 70° C.

The catalyst obtained contains 3.0% CoO, 14.0% $MoO_3$ and 2.0% $P_2O_5$. In the HDS test of thiophene, 23% HDS is obtained.

COMPARATIVE EXAMPLE B (without phosphorus)

The process is performed as in Example A, except that no phosphoric acid is used. The impregnation solution is thus prepared by dissolving, in the same amount of water, 17 g of ammonium heptamolybdate hexahydrate and 11.6 g of $Co(NO_3)_2$, added slowly. The subsequent operations are the same as in Example A.

The catalyst contains 3.0% CoO and 14.0% $MoO_3$. In the HDS test of thiophene, 25% HDS is obtained.

EXAMPLE C (without phosphorus)

The process is performed as in Comparative Example B (without phosphorus), except that another alumina support is used, with a specific surface equal to 227 $m^2/g$, a pore volume equal to 0.70 ml/g and an average pore diameter equal to 12 nm.

The catalyst obtained contains 3.0% CoO and 14.0% $MoO_3$. The degree of conversion of the thiophene corresponds to 27% HDS.

EXAMPLE D 20.6 g of phosphomolybdic acid are reacted with 4.74 g of barium hydroxide and 4.22 g of cobalt sulphate in 200 ml of water. After precipitation of the barium sulphate, a solution of $Co_{1.5}PMo_{12}O_{40}$ is collected, which product can be isolated by evaporation of the water.

This compound in aqueous solution is impregnated on alumina S247 The impregnated alumina is dried and calcined at 400° C.

The catalyst obtained contains 3.5% CoO, 16.0% $MoO_3$ and 0.6% $P_2O_5$. In the HDS test of thiophene, 15% HDS is obtained.

EXAMPLE 1

Pure crystalline phosphomolybdic acid $H_3PMo_{12}O_{40} \cdot 13H_2O$ was prepared by a conventional method. This phosphomolybdic acid is are dissolved in water. 20.6 g of $H_3PMo_{12}O_{40} \cdot 13H_2O$ are dissolved in 200 ml of water at room temperature. The dissolution is instantaneous. 1.78 g of $CoCO_3$ are added slowly to the solution, which turns cloudy and lightens after 2 hours, to become clear. 2.08 g of citric acid (pH 3.5 buffer agent) are then added; the solution remains clear. 1.18 g of Fluka® 60783 cobalt metal beads are then added. The solution turns dark blue. The mixture is left to react until all of the cobalt metal has dissolved. The physicochemical characterization of the solutions makes it possible to show that two cobalt species are interacting with the phosphomolybdic anion. The solution is then evaporated to dryness in order to recover the bulk solid. The evaporation can take place under vacuum or by lyophilization. A solid corresponding to the empirical formula: $Co_{7/2}PMo_{12}O_{40} \cdot xH_2O$ was obtained.

Per 20 g of catalyst, 3.67 g of the solid obtained above are dissolved in 13.4 ml of water. 16.8 g of alumina of Example A are then dry-impregnated with this solution. After maturation for 2 h under argon, the solid is dried at 80° C. under a flow of dry air, for 12 hours, and calcined under nitrogen for 4 h at 400° C.

The catalyst obtained containing 14.0% $MoO_3$, 2.1% CoO, 0.6% $P_2O_5$ (the remainder to 100% is alumina), in the HDS test of thiophene, gives 29% HDS. This is a better result than that obtained with the catalysts A, B, C and D prepared by conventional methods on the same support.

EXAMPLE 2

Example 1 is repeated, except that the calcination is carried out under air for 4 h at 400° C.

The same weight composition of catalyst and the same proportion of HDS, i.e. 27%, are obtained.

EXAMPLE 3

Example 1 is repeated, except that the alumina of Example A is replaced with the alumina used in Example C. The proportion of HDS is then 32%, the composition of the catalyst being unchanged.

EXAMPLE 4

Example 1 is repeated, replacing the cobalt carbonate with the same amount, calculated as cobalt, of cobalt citrate.

The same composition of the catalyst is obtained and the proportion of HDS is 27%.

EXAMPLE 5

Example 1 is repeated, replacing the citric acid with tartaric acid. More or less the same results are obtained as regards the HDS (25%).

EXAMPLE 6

Example 1 is repeated, using the dark-blue solution directly, obtained after complete dissolution of the cobalt, to dry-impregnate the same alumina as in Example A, the amount of solution corresponding to 3.67 g of the blue solid.

The catalyst had the same composition as in Example 1 and the proportion of HDS was 28%.

EXAMPLE 7

Pure crystalline silicomolybdic acid $H_4SiMo_{12}O_{40} \cdot 13H_2O$ was prepared by a conventional method. This silicomolybdic acid is redissolved in water: 30.8 g of $H_4SiMo_{12}O_{40} \cdot 13H_2O$ are dissolved in 300 ml of water at room temperature. The dissolution is instantaneous. 9.45 g of $Ba(OH)_2$ are added very slowly to the solution. The barium element then replaces the protons in the silicomolybdic acid. 8.43 g of $CoSO_4$ are then added and the mixture is left stirring for 12 hours, during which the barium sulphate precipitates out. The precipitate is separated out by decantation and filtration. 4.2 g of citric acid (pH 3.5 buffer agent) are then added to the solution, which remains clear. 1.7 g of Fluka® 60783 cobalt metal beads are then added. The solution turns dark blue. The mixture is left to react until all of the cobalt metal has dissolved. The solution is then evaporated to dryness in order to recover the bulk solid. The evaporation can take place under vacuum or by lyophilization. A solid corresponding to the empirical formula: $Co_4SiMo_{12}O_{40} \cdot xH_2O$ was obtained.

Per 20 g of catalyst, 3.7 g of the solid obtained above are dissolved in 11.4 ml of water. 16.7 g of alumina of Example C are then dry-impregnated with this solution. After maturation for 2 h under argon, the solid is dried at 80° C. under a flow of nitrogen for 12 hours and calcined under nitrogen for 4 h at 400° C.

The catalyst obtained containing 14.0% $MoO_3$, 2.4% CoO and 1.0% $SiO_2$, in the HDS test of thiophene, gives 30.1% HDS.

EXAMPLE 8

Example 7 was repeated, using 1.5 g of cobalt metal instead of 1.7 g.

The blue solid obtained as an intermediate corresponded to the formula $Co_{7/2}SiMO_{12}O_{40}$ and led to a catalyst which gave 29.6% HDS.

EXAMPLE 9

This example starts again with phosphomolybdic acid, prepared in a conventional manner. 17.6 g of $H_3PMo_{12}O_{40}.13H_2O$ are dissolved in 150 ml of water and 3.94 g of $Ba(OH)_2$ are then added slowly. After dissolution, 3.51 g of $CoSO_4$ are added. After stirring for 12 hours, the precipitate is separated out by decantation and filtration. The solution is degassed for 30 min. under argon. 2.3 ml of thioglycolic acid (reducing agent) are added, again under argon. A further 11.83 g of $Ba(OH)_2$ are added, followed by 10.54 g of $CoSO_4$, in order to exchange the acidities obtained by the reduction. After stirring for 12 hours, the precipitate is separated out by decantation and filtration; the solution is maintained under argon. After evaporation, the bulk solid is recovered. The empirical formula of the solid obtained is $Co_6PMo_{12}O_{40}.xH_2O$.

Per 20 g of catalyst, 3.91 g of the solid prepared above are dissolved in 11.3 ml of water. The dissolution is rapid and the solution is clear (dark blue). 16.5 g of alumina of Example C are dry-impregnated. After maturation for 2 h under argon, the solid is dried at 80° C. under a flow of nitrogen for 12 hours and then calcined under nitrogen for 4 h at 400° C.

The solid obtained has the empirical formula 14.0% $MoO_3$, 3.6% CoO, 0.6% $P_2O_5.xH_2O$.

The catalyst obtained gives a degree of conversion of 29% HDS from thiophene.

EXAMPLE 10

13.2 ml of the same impregnation solution as that of Example 9 are impregnated on 16.5 g of alumina S247. After maturation for 2 h under argon, the solid is dried at 80° C. under a flow of nitrogen, for 12 hours, and calcined under nitrogen for 4 h at 400° C.

The solid obtained has the composition 14.0% $MoO_3$, 3.6% CoO, 0.6% $P_2O_5$.

The catalyst obtained again gives 29% HDS.

EXAMPLE 11

Example 10 is repeated, but with the calcination being carried out under air.

The solid obtained has the composition 14.0% $MoO_3$, 3.6% CoO, 0.6% $P_2O_5$.

27% HDS are obtained.

EXAMPLE 12

The reduction of 20.6 g of phosphomolybdic acid (containing 13 molecules of water) dissolved in 200 ml of water is carried out directly with 2.8 ml of thioglycolic acid (TGA), after which the protons are exchanged by adding 6.18 g of $CoCO_3$. After evaporation, a solid of formula $Co_{5.2}PMo_{12}O_{40}.2H_2O$ is obtained.

This solid is redissolved as in Example 9. The alumina of Example C is impregnated with this solution and is then dried and/or calcined under nitrogen as above. The solid obtained has the composition 14.0% $MoO_3$, 3.15% CoO, 0.6% $P_2O_5$.

The catalyst obtained gives 32.5% HDS. This gives a more active catalyst than a catalyst prepared by a conventional method on the same alumina.

EXAMPLE 13

10.3 g of acid $H_3PMo_{12}O_{40}.13H_2O$ are dissolved in 100 ml of water and 0.24 ml of hydrazine is then added with stirring. After 4 hours, the solution is green-blue, which indicates a reduction of the phosphomolybdic acid. 2.08 g of $CoCO_3$ are then added. After stirring for 2 h and evaporation, a solid of formula $Co_{7/2}PMo_{12}O_{40}$ is obtained. After redissolving 3.67 g of this solid in 11.5 ml of water, the solution thus obtained is dry-impregnated on 16.8 g of alumina of Example C. After maturation for 2 h, followed by drying under nitrogen and calcination under nitrogen at 400° C. for 4 hours, a catalyst containing 14.0% $MoO_3$, 2.1% CoO and 0.6% $P_2O_5$ is obtained.

The activity of this catalyst in terms of HDS from thiophene gives a degree of conversion of 28.1%.

EXAMPLE 14

Example 13 is repeated, introducing the cobalt carbonate from the start of the experiment.

The same result as in the Example 13 is obtained.

EXAMPLE 15

20.57 g of silicomolybdic acid, obtained as in Example 7, are dissolved in 200 ml of distilled water at room temperature. 0.5 ml of hydrazine is then added. After stirring for two days, the mixture is evaporated under vacuum in order to recover a solid. 5.14 g of this solid are redissolved in 50 ml of water, 1.189 g of $CoCO_3$ are then added and the mixture is left until dissolution is complete. The solution is evaporated to dryness in order to recover the bulk solid of empirical formula $Co_4SiMo_{12}O_{40}.sH_2O$.

1.855 g of this solid are redissolved in 5.7 ml of water and the solution is then dry-impregnated on 8.36 g of alumina according to Example C. The solid is then treated as in Example 7. In the HDS test of thiophene, the catalyst thus obtained gives a yield of 34.2% HDS.

EXAMPLE 16

The process is performed as in Example 15, but replacing the hydrazine with 2.8 ml of thioglycolic acid.

The catalyst obtained after impregnation on alumina gives a yield of 26.3% HDS in the HDS test of thiophene.

What is claimed is:

1. Process for preparing a water-treatment catalyst, comprising a first phase of impregnating a support with an aqueous solution of at least one compound which combines at least one metal from group VI and at least one metal from group VIII in the same molecule, and at least a second phase of drying and activating the impregnated support, wherein the compound which combines the metals from groups VI and VIII corresponds to the formula:

$$M_xAB_{12}O_{40} \hspace{2cm} (I)$$

in which M is cobalt and/or nickel, A is chosen from phosphorus, silicon and boron, B is molybdenum and/or tungsten and x takes values of 2 or more if A is phosphorus, values of 2.5 or more if A is silicon, and values of 3 or more if A is boron.

2. Process according to claim 1, in which the aqueous impregnation solution is prepared by reacting a heteropolyacid of formula:

$$H_yAB_{12}O_{40} \tag{II}$$

in which A is phosphorus, silicon and/or boron, B is molybdenum and/or tungsten and y is equal to 3 if A is phosphorus, 4 if A is silicon and 5 if A is boron, with a reducing agent in the presence or with subsequent addition of a nickel or cobalt compound intended to salify the heteropolyacid.

3. Process according to claim 2, in which the reducing agent is cobalt and/or nickel metal.

4. Process according to claim 2, in which the reducing agent is hydrazine, hydroxylamine or thioglycolic acid, thiourea, aluminium hydride, borohydride, hydroquinone or triphenylphosphine.

5. Process according to claim 1, in which x, in formula (I), takes values from 2 to 7 if A is phosphorus, values from 2.5 to 8 if A is silicon and values from 3 to 8 if A is boron.

6. Process according to claim 1, which is carried out at a pH of less than 8.

7. Process according to claim 1, which is carried out in the presence of a water-soluble carboxylic acid acting as buffer agent.

8. Process according to claim 7, in which the carboxylic acid is citric acid.

9. Process according to claim 2, in which the nickel or cobalt compound is nickel carbonate and/or cobalt carbonate.

10. Process according to claim 1, in which activation of the catalyst is carried out by heating the catalyst under an inert, oxidative or reductive atmosphere to a temperature of at least 80° C.

11. Process according to claim 10, in which the temperature is greater than 250° C.

12. Process according to claim 1, in which the catalyst is mixed with a sulphur compound so as to presulphurize it.

13. Process according to claim 1 which is carried out at a pH of less than 6.

* * * * *